US012750885B2

(12) United States Patent
Zhao

(10) Patent No.: US 12,750,885 B2
(45) Date of Patent: Sep. 29, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 258 days.

(21) Appl. No.: 18/409,113

(22) Filed: Jan. 10, 2024

(65) Prior Publication Data

US 2024/0147532 A1 May 2, 2024

Related U.S. Application Data

(63) Continuation of application No. PCT/CN2021/106543, filed on Jul. 15, 2021.

(51) Int. Cl.

*H04W 74/0816* (2024.01)
*H04W 72/25* (2023.01)
*H04W 74/08* (2009.01)
*H04W 92/18* (2009.01)

(52) U.S. Cl.

CPC ....... *H04W 74/0816* (2013.01); *H04W 72/25* (2023.01); *H04W 74/0866* (2013.01); *H04W 92/18* (2013.01)

(58) Field of Classification Search

CPC ............. H04W 74/0816; H04W 72/25; H04W 74/0866; H04W 92/18

See application file for complete search history.

(56) References Cited

U.S. PATENT DOCUMENTS

2018/0317256 A1* 11/2018 Um ........................ H04W 16/14
2021/0092783 A1 3/2021 Sun et al.
2021/0194740 A1 6/2021 Aldana et al.
2021/0195637 A1 6/2021 Xue et al.
2021/0352688 A1* 11/2021 Luo ................... H04W 72/1268
2021/0400656 A1* 12/2021 Luo ........................ H04W 72/51
2022/0046467 A1* 2/2022 Zhang ............... H04W 74/0808

(Continued)

FOREIGN PATENT DOCUMENTS

CN 110891314 A 3/2020
CN 112997551 A 6/2021

(Continued)

OTHER PUBLICATIONS

Supplementary European Search Report in the European application No. 21949674.2, mailed on Jul. 17, 2024. 10 pages.

(Continued)

*Primary Examiner* — Ajay Cattungal
(74) *Attorney, Agent, or Firm* — Ladas & Parry LLP

(57) ABSTRACT

Provided are a method for wireless communication, a terminal device and a storage medium. In the method, the terminal device determines K available transmission resources; and for an i-th available transmission resource in the K available transmission resources, the terminal device determines whether to use the i-th available transmission resource for sidelink transmission according to a result of a channel access procedure, where i and K are positive integers, and 1≤i≤K.

20 Claims, 8 Drawing Sheets

(56) References Cited

U.S. PATENT DOCUMENTS

| | | | | |
|---|---|---|---|---|
| 2022/0095369 | A1 * | 3/2022 | Xue | H04L 5/001 |
| 2023/0045566 | A1 * | 2/2023 | Si | H04W 74/0808 |
| 2023/0087543 | A1 * | 3/2023 | Lin | H04L 1/1822 370/329 |
| 2023/0337285 | A1 * | 10/2023 | Lin | H04W 74/0808 |
| 2023/0345546 | A1 * | 10/2023 | Lin | H04W 74/0833 |
| 2023/0354342 | A1 * | 11/2023 | Lin | H04L 5/0053 |
| 2023/0396474 | A1 | 12/2023 | Aldana et al. | |
| 2024/0014989 | A1 * | 1/2024 | Lin | H04L 5/0092 |
| 2024/0090026 | A1 * | 3/2024 | Prasad | H04B 7/06952 |

FOREIGN PATENT DOCUMENTS

| | | | |
|---|---|---|---|
| WO | 2019185010 | A1 | 10/2019 |
| WO | 2021012167 | A1 | 1/2021 |

OTHER PUBLICATIONS

International Search Report in the international application No. PCT/CN2021/106543, mailed on Apr. 7, 2022. 5 pages with English translation.

Written Opinion of the International Search Authority in the international application No. PCT/CN2021/106543, mailed on Apr. 7, 2022. 8 pages with English translation.

"3rd Generation Partnership Project; Technical Specification Group Radio Access Network; NR; Physical layer procedures for data (Release 16)", 3GPP TS 38.214 V16.3.0 (Sep. 2020), section 8.1.4. 165 pages.

"3rd Generation Partnership Project; Technical Specification Group Radio Access Network; Physical layer procedures for shared spectrum channel access (Release 16)", 3GPP TS 37.213 V16.6.0 (Jun. 2021), the whole document. 27 pages.

Supplementary European Search Report in European application No. 26152189.2, mailed on May 21, 2026.

* cited by examiner (a)

(b)

WIRELESS COMMUNICATION METHOD AND DEVICE

CROSS-REFERENCE TO RELATED APPLICATION

This application is a continuation of International Patent Application No. PCT/CN2021/106543 filed on Jul. 15, 2021, the contents of which are hereby incorporated by reference in its entirety.

BACKGROUND

There may be devices applied in multiple communication systems on an unlicensed spectrum, and spectrum resources are shared among the devices. Therefore, on the unlicensed spectrum, when a terminal needs to transmit, it needs to perform Listen Before Talk (LBT). If LBT is successful, the unlicensed spectrum may be used for data transmission, otherwise, data transmission is postponed until LBT is successful. For terminals in a sidelink transmission system, how to transmit data on the unlicensed spectrum is a problem that needs to be solved.

SUMMARY

Embodiments of the present disclosure relate to the field of communications, and in particular to a method and a device for wireless communication.

Embodiments of the present disclosure provide a method and a device for wireless communication. A terminal device may determine whether to use available transmission resources for sidelink transmission based on a result of a channel access procedure, so that the terminal device can use an unlicensed spectrum for sidelink transmission.

According to a first aspect, there is provided a method for wireless communication, which includes the following operations.

A terminal device determines K available transmission resources; and for an i-th available transmission resource in the K available transmission resources, the terminal device determines whether to use the i-th available transmission resource for sidelink transmission according to a result of a channel access procedure; where i and K are positive integers, and $1 \le i \le K$.

According to a second aspect, there is provided a terminal device, including a processor configured to implement the method in the above first aspect.

According to a third aspect, there is provided a computer-readable storage medium, configured to store a computer program that causes a computer to implement the method in the above first aspect.

DETAILED DESCRIPTION

Figure 1:
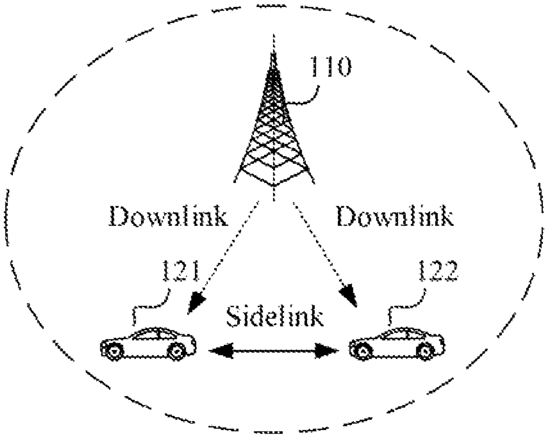
FIG. 1 is a schematic diagram of a communication system architecture applied in an embodiment of the present disclosure.

The technical solution of the embodiments of the present disclosure will be described below in conjunction with the drawings in the embodiments of the present disclosure, and it will be apparent that the described embodiments are part of the embodiments of the present disclosure, but not all of them. Based on the embodiments in the present disclosure, all other embodiments obtained by those skilled in the art without making creative efforts fall within the scope of protection of the present disclosure.

The technical solution of the embodiments of the present disclosure may be applied to various communication systems. For example, a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a non-terrestrial networks (NTN) system, a universal mobile telecommunication system (UMTS), a wireless local area network (WLAN), a wireless fidelity (WiFi), a 5th-generation (5G) communication system or other communication systems.

Generally speaking, conventional communication systems support a limited number of connections and are easy to implement. However, with the development of communication technology, mobile communication systems will not only support conventional communication, but also support, for example, a device to device (D2D) communication, a machine to machine (M2M) communication, a machine type communication (MTC), a vehicle to vehicle (V2V) communication, a vehicle to everything (V2X), etc. Embodiments of the present disclosure may also be applied to these communication systems.

Optionally, the communication system in the embodiments of the present disclosure may be applied to a carrier aggregation (CA) scenario, a dual connectivity (DC) scenario, or a standalone (SA) network distribution scenario.

Optionally, the communication system in the embodiments of the present disclosure may be applied to an unlicensed spectrum, where the unlicensed spectrum may also be considered as a shared spectrum. Optionally, the communication system in the embodiments of the present disclosure may also be applied to a licensed spectrum, where the licensed spectrum may also be considered as a non-shared spectrum.

Embodiments of the present disclosure are described in connection with a network device and a terminal device. The terminal device may be referred to as user equipment (UE), an access terminal, a subscriber unit, a subscriber station, a mobile station, a mobile platform, a remote station, a remote terminal, a mobile device, a user terminal, a terminal, a wireless communication device, a user agent, or a user device.

The terminal device may be a STATION (ST) in the WLAN, or may be a cellular phone, a cordless phone, a session initiation protocol (SIP) telephone, wireless local loop (WLL) station, a personal digital assistant (PDA) device, a handheld device with wireless communication function, a computing device or other processing device connected to wireless modem, an in-vehicle device, a wearable device, a next-generation communication system such as a terminal device in an NR network, or a terminal device in the future evolved public land mobile network (PLMN) network, etc.

In the embodiments of the present disclosure, the terminal device may be deployed on land, including indoor or outdoor, hand-held, wearable or in-vehicle. The terminal device may also be deployed on the water (such as on ships, etc.). The terminal device may also be deployed in the air, such as on airplanes, balloons and satellites, etc.

In the embodiments of the present disclosure, the terminal device may be a mobile phone, a pad, a computer with wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or smart home, etc.

By way of example and not limitation, in the embodiments of the present disclosure, the terminal device may also be a wearable device. The wearable device may also be called wearable intelligent device, which is the general name of wearable devices developed by applying wearable technology to intelligently design daily wear, such as glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. Generalized wearable smart devices include full functions and large size, which may realize complete or partial functions without relying on smart phones, such as smart watches or smart glasses, and only focus on certain application functions, and the wearable smart devices need to be used in conjunction with other devices such as smart phones, such as various smart bracelets and smart jewelry for monitoring physical signs.

In the embodiments of the present disclosure, the network device may be a device for communicating with a mobile device, and the network device may be an access point (AP) in WLAN, a base transceiver station (BTS) in GSM or CDMA, a base station (NodeB, NB) in WCDMA, an evolutional node B (eNB or eNodeB) in LTE, a relay station or an access point, or an in-vehicle device, a wearable device, a network device or a base station (gNB) in NR network, a network device in future evolved PLMN network or a network device in NTN network, etc.

By way of example and not limitation, in the embodiments of the present disclosure, the network device may have mobility characteristics, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. Optionally, the network device may also be a base station arranged on land, in water areas and the like.

In the embodiments of the present disclosure, the network device may provide services for a cell, the terminal device communicates with the network device through transmission resources (e.g. frequency domain resources, or spectrum resources) used by the cell, the cell may be a cell corresponding to a network device (e.g. a base station), the cell may belong to a macro base station or a base station corresponding to a small cell. The small cell may include metro cell, micro cell, pico cell, femto cell, etc. These small cells have the characteristics of small coverage and low transmission power, and are suitable for providing high-speed data transmission services.

It should be understood that the terms "system" and "network" of the present disclosure are often used interchangeably herein. In the present disclosure, the term "and/or" is used to describe an association relationship of associated objects, and represents that there may be three relationships. For example, A and/or B may represent the following three situations: i.e., independent existence of A, existence of both A and B and independent existence of B. In addition, the character "/" in the present disclosure generally represents that an "or" relationship is formed between the previous and next associated objects.

Terms used in the embodiments of the present disclosure are used only for explanation of specific embodiments of the present disclosure and are not intended to be limiting. Terms "first", "second", "third", "fourth", etc. in the description and claims of the present disclosure and the above drawings are used to distinguish different objects, and are not used to describe a particular order. Furthermore, the terms "including/includes" and "having" and any variations thereof are intended to cover non-exclusive inclusion.

It should be understood that the "indicate" mentioned in embodiments of the present disclosure may be a direct indication, may be an indirect indication, or may indicate an association relationship. For example, A indicates B, which may mean that A directly indicates B, for example, B may be obtained through A. It may also mean that A indirectly indicates B, for example, A indicates C, and B may be obtained by C. It may also indicate that there is an association relationship between A and B.

In the description of embodiments of the present disclosure, the term "correspond" may mean that there is a direct correspondence or an indirect correspondence relationship between the two, or may also mean that there is an association relationship between the two, or may also be a relationship between indication and being indicated, configuration and being configured, etc.

In the embodiments of the present disclosure, the "predefined" or "pre-configured" may be implemented by pre-storing corresponding codes, tables, or other manners that may be used to indicate relevant information in devices (e.g., including terminal devices and network devices), the specific implementation of which is not limited by the present disclosure. For example, predefined may refer to what is defined in the protocol.

In the embodiments of the present disclosure, the "protocol" may refer to standard protocols in the communication field, such as LTE protocol, NR protocol, and related protocols applied in future communication systems, which are not limited herein.

In order to facilitate understanding of the technical solution of the embodiments of the present disclosure, the technical solution of the present disclosure are described in detail by specific embodiments below. The following related technologies may be combined with the technical solution of the embodiments of the present disclosure arbitrarily as an optional solution, all of which belong to the protection scope of the embodiments of the present disclosure. Embodiments of the present disclosure include at least some of the following contents.

FIG. 1 is a schematic diagram of a communication system applied in an embodiment of the present disclosure. Transmission resources for vehicle terminals (including a vehicle terminal 121 and a vehicle terminal 122) are allocated by a base station 110, and the vehicle terminals transmit data on the sidelink according to the resources allocated by the base station 110. Specifically, the base station 110 may allocate resources for single transmission to the terminal or may allocate resources for semi-persistent transmission to the terminal.

Figure 2:
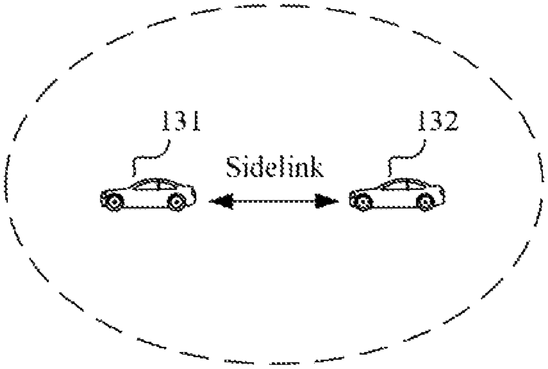
FIG. 2 is a schematic diagram of another communication system architecture applied in an embodiment of the present disclosure.

FIG. 2 is a schematic diagram of another communication system applied in an embodiment of the present disclosure. Vehicle terminals (including a vehicle terminal 131 and a vehicle terminal 132) select transmission resources autonomously from resources for sidelink to perform data transmission. Optionally, the vehicle terminals may select the transmission resources randomly or select the transmission resources by sensing.

Figure 3:
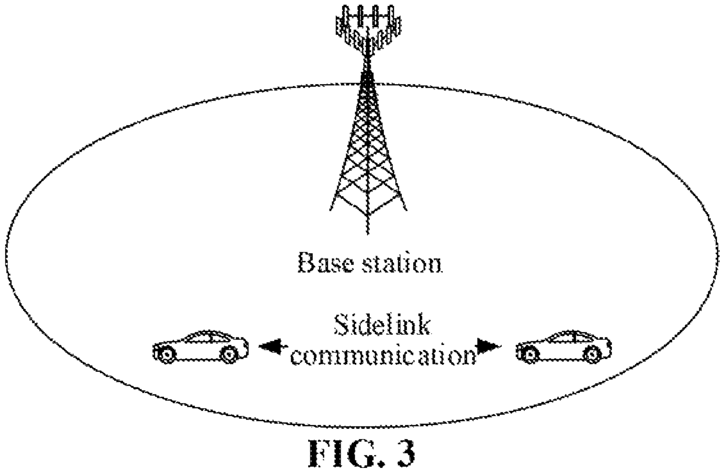
FIG. 3 is a schematic diagram of a sidelink communication within a network coverage provided by the present disclosure.
Figure 4:
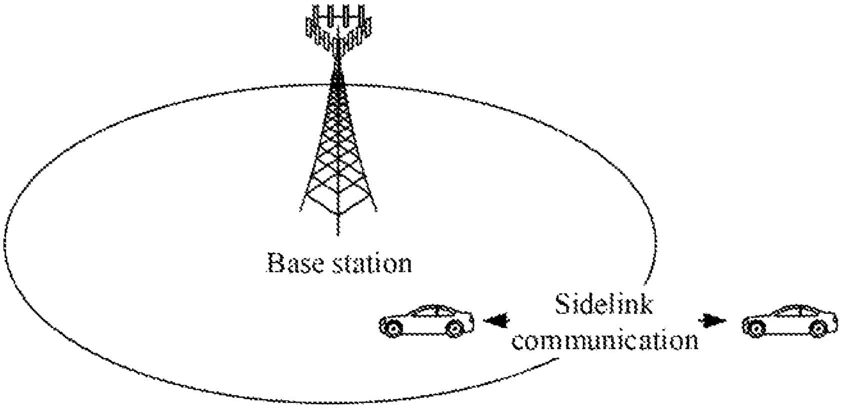
FIG. 4 is a schematic diagram of a sidelink communication partially covered by a network provided by the present disclosure.
Figure 5:
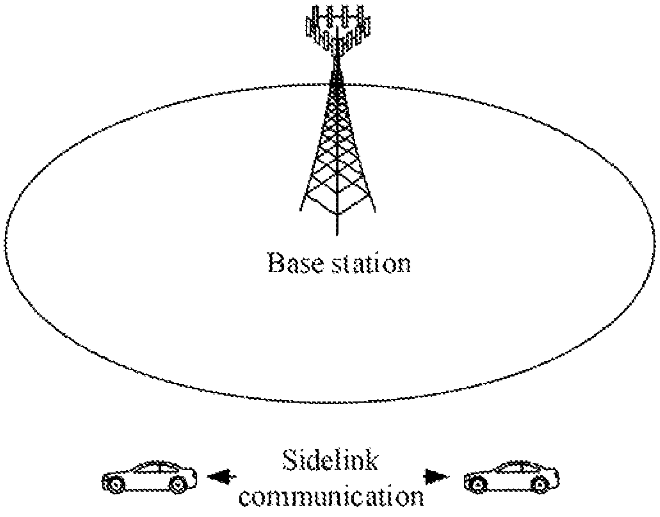
FIG. 5 is a schematic diagram of a sidelink communication outside a network coverage provided by the present disclosure.

It should be noted that in the sidelink communication, according to the situations of network coverage where the communication terminal(s) is located, the sidelink communication may be divided into sidelink communication within the network coverage as illustrated in FIG. 3, sidelink communication partially covered by a network as illustrated in FIG. 4, and sidelink communication outside the network coverage as illustrated in FIG. 5.

Referring to FIG. 3, in the sidelink communication within the network coverage, all terminals performing sidelink communication are within the coverage of the same base station, so that all of these terminals may perform sidelink communication based on the same sidelink configuration by receiving configuration signaling of the base station.

Referring to FIG. 4, in a case of sidelink communication partially covered by the network, a part of the terminals performing sidelink communication is located within the coverage of the base station and the part of the terminals may receive a configuration signaling of the base station and may perform sidelink communication according to the configuration of the base station. However, terminals located outside the coverage of the network cannot receive the configuration signaling of the base station. In this case, the terminals outside the coverage of the network determine the sidelink configuration according to pre-configuration information and information carried in the physical sidelink broadcast channel (PSBCH) sent by the terminal(s) located within the network coverage, and performs sidelink communication.

Referring to FIG. 5, for the sidelink communication outside the network coverage, all terminals performing sidelink communication are located outside the network coverage, and all of the terminals determine sidelink configuration based on pre-configuration information to perform sidelink communication.

Figure 6:
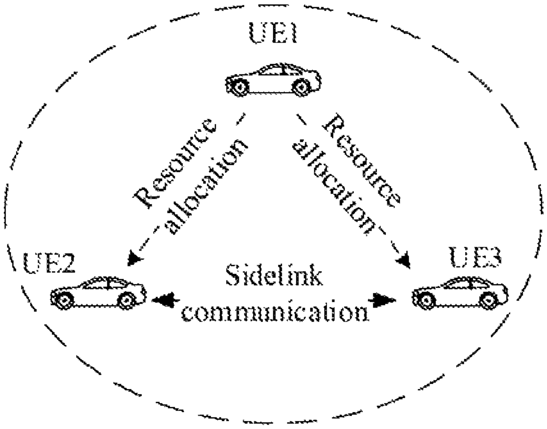
FIG. 6 is a schematic diagram of a sidelink communication where a central control node exists provided by the present disclosure.

Referring to FIG. 6, for sidelink communication where a central control node exists, a plurality of terminals form a communication group. The communication group has a central control node and may also become a Cluster Header (CH). The central control node has one of the following functions: responsible for establishment of the communication group and joining and leaving of group members; performing resource coordination, allocating sidelink transmission resources for other terminals and receiving sidelink feedback information of other terminals; performing resource coordination with other communication groups and other functions.

It should be noted that device to device (D2D) communication is a Sidelink (SL) transmission technology based on D2D, which is different from a traditional cellular system in which communication data is received or transmitted through a base station, and thus it has higher spectrum efficiency and lower transmission delay. The V2X system adopts a manner of D2D direct communication, and two transmission modes are defined in 3GPP, which are respectively recorded as a first mode (i.e., sidelink resource allocation mode 1) and a second mode (i.e., sidelink resource allocation mode 2).

In the first mode, transmission resources for a terminal are allocated by a base station, and the terminal transmits data on a sidelink according to the resources allocated by the base station. The base station may allocate resources for single transmission for the terminal, and may also allocate resources for semi-persistent transmission for the terminal. As illustrated in FIG. 3, the terminal is located within the network coverage, and the network allocates transmission resources for sidelink transmission for the terminal.

In the second mode, the terminal selects a resource from a resource pool to transmit data. As illustrated in FIG. 5, the terminal is located outside the coverage area of the cell, and the terminal selects transmission resources autonomously in the pre-configured resource pool for sidelink transmission. Or, as illustrated in FIG. 3, the terminal selects the transmission resources autonomously in the resource pool configured by the network for sidelink transmission.

In New Radio-Vehicle to Everything (NR-V2X), automatic driving is supported, so higher requirements are put forward for data interaction between vehicles, such as higher throughput, lower delay, higher reliability, larger coverage and more flexible resource allocation.

Figure 7:
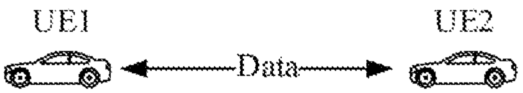
FIG. 7 is a schematic diagram of a unicast sidelink communication provided by the present disclosure.
Figure 8:
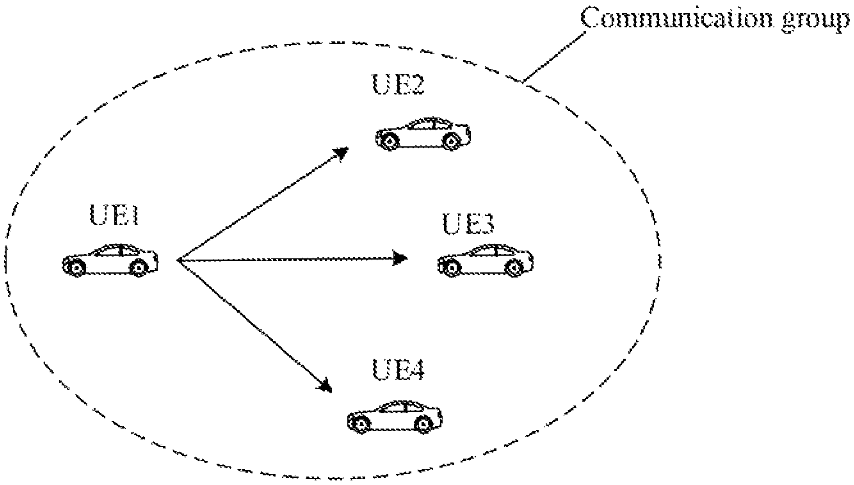
FIG. 8 is a schematic diagram of a multicast sidelink communication provided by the present disclosure.
Figure 9:
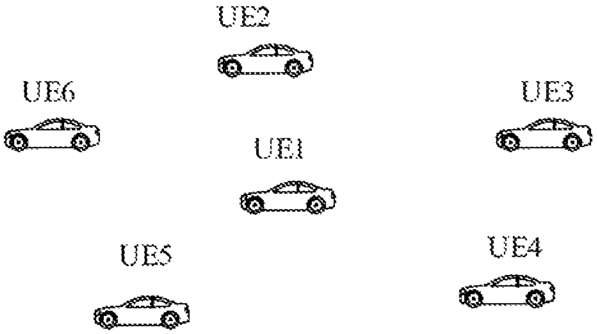
FIG. 9 is a schematic diagram of a broadcast sidelink communication provided by the present disclosure.

In LTE-V2X, broadcast transmission manner is supported, and in NR-V2X, unicast and multicast transmission manners are introduced. For unicast transmission, there is only one terminal at the receiver terminal, and as illustrated in FIG. 7, unicast transmission is performed between UE1 and UE2. For multicast transmission, the receiver terminal is all terminals in a communication group or all terminals within a certain transmission distance. As illustrated in FIG. 8, UE1, UE2, UE3 and UE4 form a communication group, in which UE1 sends data, and other terminal devices in the group are receiver terminals. In the broadcast transmission manner, the receiver terminal is any terminal around a sender terminal, and as illustrated in FIG. 9, UE1 is the sender terminal, and other terminals around it, UE2, UE3, UE4, UE5 and UE6, are all receiver terminals.

In order to better understand the embodiments of the present disclosure, the frame structure of the NR-V2X system related to the present disclosure is explained.

Figure 10:
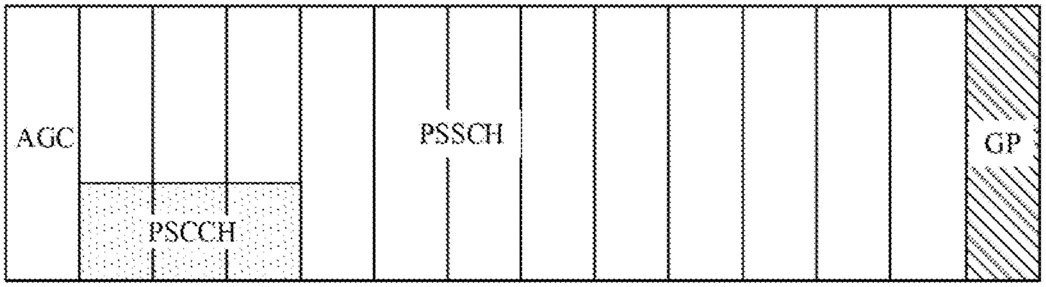
FIG. 10 is a schematic diagram of a slot structure in an NR-V2X provided by the present disclosure.
Figure 10:
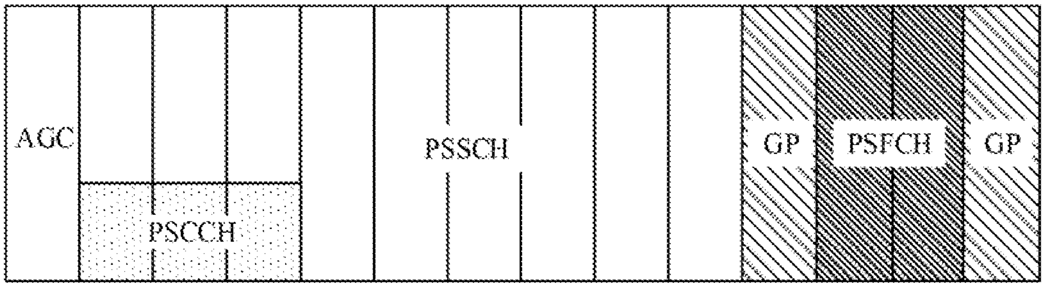

A slot structure in NR-V2X is illustrated in FIG. 10, where (a) in FIG. 10 illustrates a slot structure in which a Physical Sidelink Feedback Channel (PSFCH) is not included in the slot, and (b) in FIG. 10 illustrates a slot structure in which the PSFCH is included in the slot.

In NR-V2X, a Physical Sidelink Control Channel (PSCCH) occupies 2 or 3 Orthogonal frequency-division multiplexing (OFDM) symbols in the time domain starting from a second sidelink symbol of the slot, and may occupy {10, 12 15, 20, 25}physical resource blocks (PRB) in the frequency domain. In order to reduce the complexity of blind detection of PSCCH by UE, only one number of PSCCH symbols and one number of PRBs may be configured in a resource pool. In addition, because the sub-channel is the minimum granularity in resource allocation of Physical Sidelink Shared Channel (PSSCH) in the NR-V2X, the number of PRBs occupied by PSCCH must be less than or equal to the number of PRBs contained in a sub-channel in the resource pool, so as to avoid additional restrictions on PSSCH resource selection or allocation. PSSCH also starts from the second sidelink symbol of the slot in time domain, the last time domain symbol in the slot is a Guard Period (GP) symbol, and the PSSCH is mapped in the remaining symbols. The first sidelink symbol in the slot is repetition of the second sidelink symbol, and the first sidelink symbol is used by the receiving terminal typically as an Automatic Gain Control (AGC) symbol, the data on which is not used for data demodulation typically. PSSCH occupies M sub-channels in the frequency domain, and each sub-channel includes N consecutive PRBs, as illustrated in (a) of FIG. 10.

When a PSFCH channel is included in a slot, a penultimate symbol and an antepenultimate symbol in the slot are used for PSFCH channel transmission, and a time domain symbol preceding the PSFCH channel is used as a GP symbol, as illustrated in (b) of FIG. 10.

In order to better understand the embodiments of the present disclosure, the sensing-based resource selection related to the present disclosure is described.

In Mode 2 of NR-V2X, that is, in the second mode, the terminal device selects transmission resources autonomously from the resource pool. Full sensing or partial sensing are supported, where full sensing means that the terminal may sense data sent by other terminals in all slots (or subframes) except a slot in which the data is sent; and partial sensing is to save energy for the terminal, and the terminal only needs to sense some part of slots (or subframes) and selects resources based on the results of partial sensing.

Specifically, when the high layer is not configured with partial sensing, resource selection is performed in the manner of full sensing by default.

At time n, the high layer triggers the physical layer to report the transmission resource set, and the physical layer performs sensing according to indication information of the high layer. The terminal determines a sensing window $$\left[n - T_0,\ n - T^{SL}_{proc,0}\right)$$

and a selection window $[n+T_1,n+T_2]$, and determines a candidate resource set in the selection window according to the sensing result in the sensing window. Specifically, $T_0=1000$, $$T^{SL}_{proc,0} = 1.$$

Figure 11:
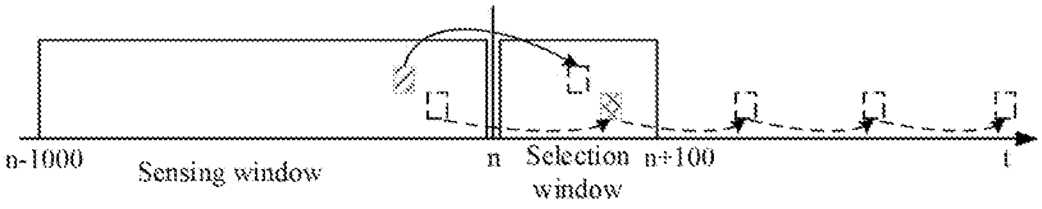
FIG. 11 is a schematic diagram of a resource sensing provided by the present disclosure.

As illustrated in FIG. 11, the terminal selects resources in $[n+T_1,n+T_2]$ according to the sensing results in the sensing window $[n-1000, n-1)$. The time units of the sensing window and the selection window are at least one of the following: milliseconds, slots or subframes.

The time n includes at least one of the following: a time when the resource selection is triggered, a time when the resource reselection is triggered, a time when the high layer triggers the low layer to perform resource reporting, and a time when a new data packet arrives.

The above-mentioned multiple times may be the same time, for example, the time when the resource selection is triggered is also the time when the new data packet arrives; the time when the resource reselection is triggered is also the time when the new data packet arrives; the time when the resource selection is triggered is also the time when the high layer triggers the low layer to perform resource reporting. Where $$0 \le T_1 \le T^{SL}_{proc,1},$$

$T_{2min} \le T_2 \le$ remaining packet delay budget (PDB), $$T^{SL}_{proc,1}$$

is a processing delay, and $T_{2min}$ is the configuration parameter. For example, if the remaining PDB is 100 and $T_{2min}=20$, then $20 \le T_2 \le 100$, as illustrated in FIG. 11.

The process of resource selection in the selection window is as follows: (for the specific resource selection process, please refer to the operation steps described in the standard protocol version 3GPP TS38.214 v 16.3.0, and several main resource selection steps are listed here)

1. The terminal takes all available resources in the selection window as a set A.
2. If the terminal has no sensing results in some subframes within the sensing window, the resources of these subframes in the corresponding subframes within the selection window are excluded.
3. If a PSCCH is detected in the sensing window by the terminal, Reference Signal Received Power (RSRP) of a PSSCH scheduled by the PSCCH or RSRP of the PSCCH is measured. If the measured RSRP is higher than an RSRP threshold and a reserved transmission resource determined according to the reserved information in the control information has resource conflict with the data to be sent by the user, then the resource in the set A is excluded by the user. The selection of RSRP threshold is determined by priority information carried in the detected PSCCH and a priority of the data to be transmitted by the terminal.

4. If the number of remaining resources in the set A is less than X % (X=20, 35 or 50) of the total number of resources, the terminal will raise the threshold of PSSCH-RSRP by 3 dB and repeat steps 1-3 until the number of remaining resources in the set A is greater than X % of the total number of resources.
5. The terminal reports the set A to the high layer of the terminal.
6. The terminal selects resources from the set A with equal probability for data transmission.

Compared with the manner of full sensing, the terminal based on partial sensing selects Y slots in the resource selection window, and determines whether the resources on the Y slots may be used as candidate resources according to the sensing result. The specific process of determining the candidate resource set A is similar to that in the full sensing process, and will not be described here.

In order to better understand the embodiments of the present disclosure, the unlicensed spectrum related to the present disclosure is explained.

The unlicensed spectrum is a spectrum divided by countries and regions and may be used for radio device communication, which is usually considered as a shared spectrum, that is, communication devices in different communication systems may use this spectrum as long as the communication devices meet the regulatory requirements set by countries or regions on this spectrum, without applying for exclusive spectrum licensing from the government.

In order for various communication systems that use an unlicensed spectrum for wireless communication to coexist amicably on the spectrum, some countries or regions have stipulated the regulatory requirements that must be met when using unlicensed spectrum. For example, the communication device follows the "LBT" principle, that is, the communication device, before sending signals on a channel of an unlicensed spectrum, needs to perform sensing of the channel, and the communication device can send signals only when the channel sensing result is that the channel is idle. If the channel sensing result of the communication device on the channel of the unlicensed spectrum is that the channel is busy, the communication device cannot perform signal transmission. In order to ensure fairness, in one transmission, the time duration during which the communication device uses the channel of unlicensed spectrum for signal transmission cannot exceed the Maximum Channel Occupancy Time (MCOT).

Transmission on the shared spectrum involves the following basic concepts.

MCOT, which refers to the maximum length of time when a channel of a shared spectrum is allowed to be used for signal transmission after successful channel sensing on the channel of the shared spectrum.

Channel Occupancy Time (COT), which refers to the length of time when the channel is used for signal transmission after successful channel sensing on the channel of the shared spectrum, and may also be considered as the length of time when a channel of a shared spectrum is occupied after successful channel sensing on the channel of the shared spectrum. The signal occupying the channel may be continuous or discontinuous within the length of time, and the length of time includes the total time during which a device initiating channel occupancy and a device sharing channel occupancy perform signal transmission.

Channel occupancy time of network device (gNB/eNB-initiated COT), which is also known as COT initiated by the network device, and it refers to a channel occupancy time obtained by network device after successful channel sensing on the channel of the shared spectrum. The COT initiated by the network device may not only be used for transmission by the network device, but also be used for transmission by the terminal device under certain conditions. The COT of the network device is used by the terminal device for transmission, which is also called that the terminal device shares the COT for transmission.

Channel occupancy time of terminal device (UE-initiated COT), which is also known as COT initiated by the terminal device, and it refers to a channel occupancy time obtained by the terminal device after successful channel sensing on the channel of the shared spectrum. The COT initiated by the terminal device may not only be used for transmission by the terminal device, but also be used for transmission by the network device under certain conditions.

Downlink transmission opportunity, which refers to a set of downlink transmissions (that is, including one or more downlink transmissions) performed by the network device, and the set of downlink transmissions is continuous transmissions (that is, there is no gap between multiple downlink transmissions), or has a gap in the set of downlink transmissions but the gap is less than or equal to 16 μs. If the gap between two downlink transmissions performed by the network device is greater than 16 μs, the two downlink transmissions are considered to be two downlink transmission opportunities.

Uplink transmission opportunity, which refers to a set of uplink transmissions (that is, including one or more uplink transmissions) performed by the network device, and the set of uplink transmissions is continuous transmissions (that is, there is no gap between multiple uplink transmissions), or has a gap in the set of uplink transmissions but the gap is less than or equal to 16 μs. If the gap between two uplink transmissions performed by the terminal device is greater than 16 μs, the two uplink transmissions are considered to be two uplink transmission opportunities.

Successful channel sensing, which is also known as that a channel is sensed to be idle. For example, the energy detection for the channel in the detection slot is lower than the energy detection threshold.

Unsuccessful channel sensing, which is also known as that channel is sensed to be busy. For example, the energy detection for the channel in the detection slot is higher than or equal to the energy detection threshold.

Channel Access Type (CAT or Cat), which includes Type 1 channel access type or Type 2 channel access type. Type 1 channel access type is equivalent to Cat-4 LBT, and Type 2 channel access type is equivalent to Cat-2 LBT of 25 μs.

Figure 12:
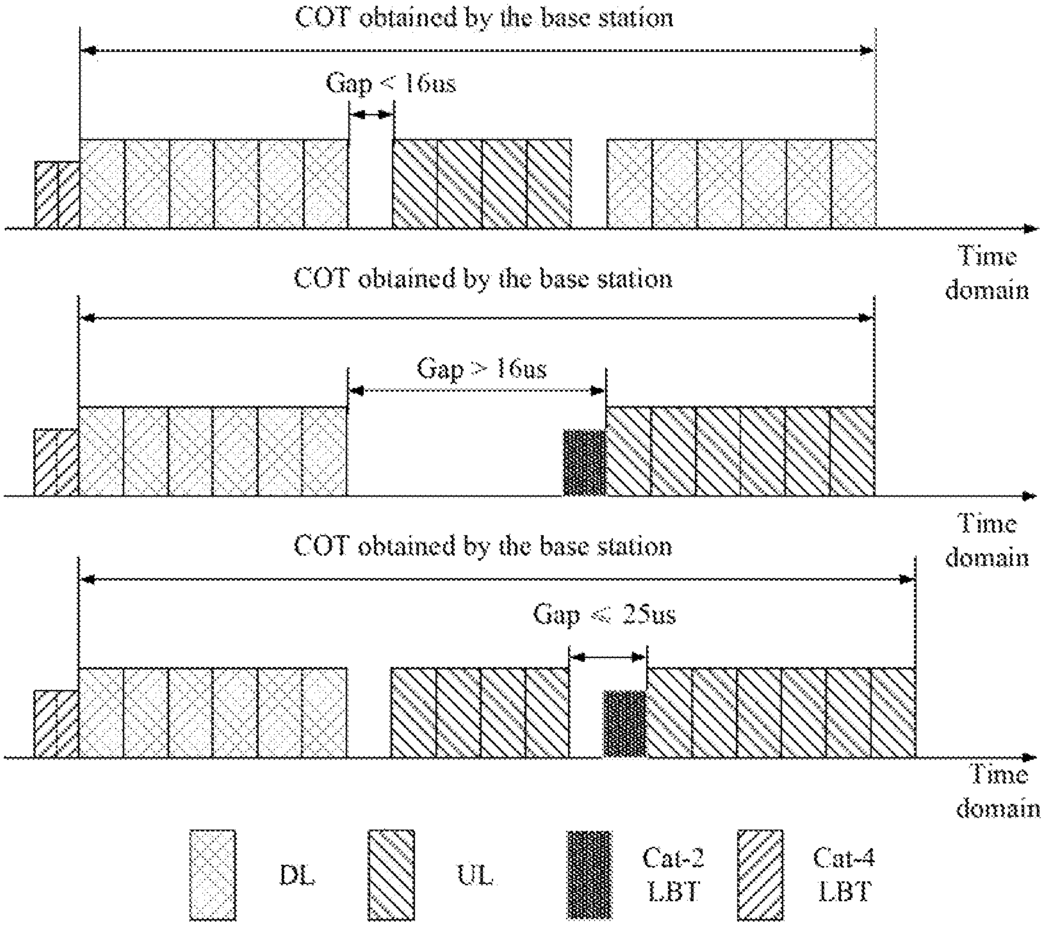
FIG. 12 is a schematic diagram of a channel occupancy provided by the present disclosure.

In some embodiments, when a network device initiates a COT, resources within the COT may be used for UE to perform uplink transmission. An uplink transmission opportunity occurs within the COT of the network device, if the gap between the starting position of the uplink transmission opportunity and the ending position of a downlink transmission opportunity is less than 16 μs, the UE may perform immediately the uplink transmission (or Cat-1 LBT). If there is no downlink (DL) transmission opportunity after the uplink (UL) transmission opportunity within the COT of the network device, the UE may perform Cat-2 LBT before transmission. If the gap between any two adjacent transmissions within the COT of the network device is less than or equal to 25 μs, the UE may perform Cat-2 LBT. FIG. 12 illustrates an example.

Cat-1 LBT may refer to that a communication device performs transmission without channel sensing after the gap ends. The Cat-2 LBT may refer to that a communication device performs single-slot channel sensing, and in particular, the Cat-2 LBT may include a single-slot channel sensing of 25 microseconds and a single-slot channel sensing of 16 microseconds. For an uplink transmission opportunity occurring within the COT of the network device, if the gap between the starting position of the uplink transmission opportunity and the ending position of a downlink transmission opportunity is 16 μs, the UE may perform a Cat-2 LBT of 16 μs before the uplink transmission. If the gap between the starting position of the uplink transmission opportunity and the ending position of the downlink transmission opportunity is 25 μs, the UE may perform a Cat-2 LBT of 25 μs before the uplink transmission. The network device may ensure the size of the gap between the starting position of the uplink transmission opportunity and the ending position of the downlink transmission opportunity, and notify the terminal device of the gap size information or the corresponding LBT manner.

It should be understood that the network device may obtain the channel occupancy time through a channel access manner of Load-based equipment (LBE), that is, the communication device may perform LBT on the unlicensed spectrum after services arrive, and start transmission of signals after the LBT is successful. The network device may also obtain the channel occupancy time through a channel access manner of frame based equipment (FBE), that is, the communication device performs LBT on an unlicensed spectrum periodically.

The network device may obtain the channel occupancy time through Cat-4 LBT if the channel access manner of LBE is used. Cat-4 LBT may refer to that the channel sensing manner of the communication device is multi-slot channel sensing based on random backoff adjusted by a size of a contention window. Specifically, the Cat-4 LBT may include different channel access priorities depending on priorities of the transmitted services.

Figure 13:
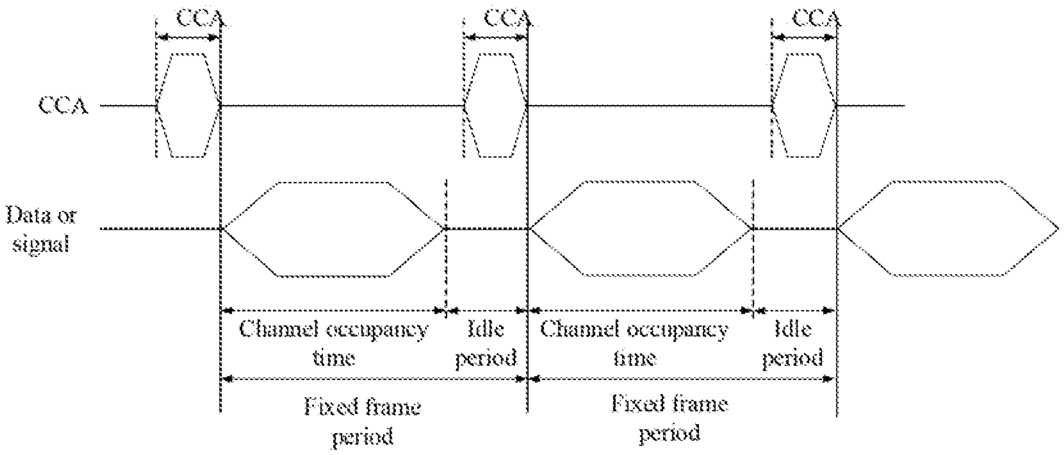
FIG. 13 is a schematic diagram of a channel access manner based on FBE provided by the present disclosure.

If the channel access manner of FBE is used, as illustrated in FIG. 13, in this manner, the frame structure appears periodically, a frame structure includes a fixed frame period (of which the length does not exceed 200 ms), a channel occupancy time (of which the length does not exceed 95% of the fixed frame period), an idle time (of which the length is at least 5% of the channel occupancy time, the minimum value is 100 us, and it is located at the tail of the fixed frame period), and in addition, a Clear Channel Assessment (CCA) is performed. The network device performs LBT on the unlicensed spectrum in the idle time (for example, it may be single slot channel sensing). If the LBT is successful, the channel occupancy time in the next fixed frame period may be used to transmit signals. If the LBT fails, the channel occupancy time in the next fixed frame period cannot be used to transmit the signals. In other words, the channel resources that the communication device may use for service transmission appear periodically.

To facilitate a better understanding of the embodiments of the present disclosure, indication of a channel access type in a Long Term Evolution Licensed-Assisted Access (LTE-LAA) system is described.

In the LTE-LAA system, when the terminal device is scheduled to transmit a Physical Uplink Shared Channel (PUSCH), the network device will indicate a channel access type and a channel access priority class corresponding to the PUSCH by Downlink Control Information (DCI) carrying UL grant.

Channel Access Type (CAT): 1 bit, indicating Type 1 channel access type or Type 2 channel access type. Type 1 channel access type is equivalent to Cat-4 LBT, and Type 2 channel access type is equivalent to Cat-2 LBT of 25 μs. The principle of the network device indicating the channel access type is that if the PUSCH to be transmitted is within the COT of the network device, Cat-2 LBT is indicated; otherwise, Cat-4 LBT is indicated.

Channel Access Priority Class (CAPC): 2 bits, which are used to determine corresponding channel access parameters from Table 1 below when the channel access type is Type 1 channel access type. Table 1 illustrates the channel access parameters corresponding to different channel access priority classes under Cat-4 LBT. The smaller the value of p is, the higher the channel access priority class becomes.

TABLE 1

| CAPC (p) | $m_p$ | $CW_{min,p}$ | $CW_{max,p}$ | $T_{mcot,p}$ | Allowed value of $CW_p$ |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or10 ms | {15, 31, 63, 127, 255, 511, 1023} |

It should be noted that in Table 1 above, $m_p$ refers to the number of backoff slots corresponding to channel access priority class p, $CW_p$ refers to the size of contention window corresponding to channel access priority class p, $CW_{min,p}$ refers to the minimum value of $CW_p$ corresponding to channel access priority class p, $CW_{max,p}$ refers to the maximum value of $CW_p$ corresponding to channel access priority class p, and $T_{mcot,p}$ refers to the length of maximum channel occupancy time corresponding to channel access priority class p.

Figure 14:
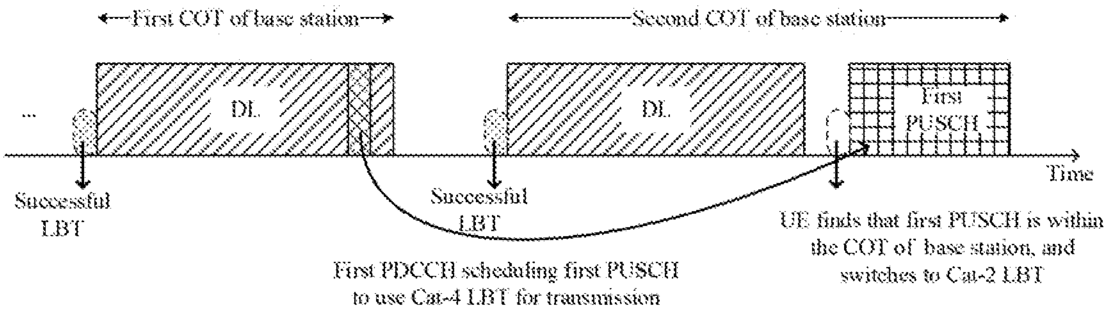
FIG. 14 is a schematic diagram of switching a channel access type provided by the present disclosure.

It should also be noted that only one uplink/downlink switching point is allowed during the channel occupancy time of the network device. In addition, when the channel access type corresponding to the PUSCH to be transmitted by the terminal device is indicated as the Type 1 channel access type, if the terminal device receives common indication information sent by the network device, the terminal device determines the resources of uplink transmission shared by the channel occupancy time of the network device according to the common indication information, and determines that the PUSCH to be transmitted (i.e., the first PUSCH scheduled by the first Physical Downlink Control Channel (PDCCH) is within the channel occupancy time shared by the network device, then the terminal device may switch the Type 1 channel access type corresponding to the PUSCH to the Type 2 channel access type, as illustrated in FIG. 14.

To facilitate a better understanding of the embodiments of the present disclosure, an indication of a channel access type in an NR-U system is described.

Similar to the LTE-LAA system, in the NR-U system, when the terminal device is scheduled to perform transmission of a PUSCH, the network device may also indicate the channel access type and channel access priority class corresponding to the PUSCH through DCI carrying UL grant.

Unlike the LTE-LAA, in the NR-U system, the channel access types to be indicated may include Cat-1 LBT, Cat-2 LBT and Cat-4 LBT, where the Cat-2 LBT includes Cat-2 LBT of 25 μs and Cat-2 LBT of 16 μs. In addition, there may be more than one uplink/downlink switching point in the channel occupancy time of the network device in the NR-U system.

In order to better understand the embodiments of the present disclosure, the related art and the existing problems related to the present disclosure are explained.

There may be devices applied in multiple communication systems on the unlicensed spectrum, and spectrum resources are shared among the devices. Therefore, on the unlicensed spectrum, when the terminal needs to perform transmission, it needs to perform LBT. If LBT is successful, the unlicensed spectrum may be used for data transmission, otherwise, data transmission is postponed until LBT is successful. When a sidelink transmission system works in an unlicensed spectrum, terminals of the sidelink transmission system also need to determine, through LBT, whether the unlicensed spectrum may be used for transmission, while in the sidelink transmission system, it is necessary to avoid the interference between the terminals in the sidelink transmission system needs through sensing to determine the available transmission resources. Therefore, how to transmit data on the unlicensed spectrum of the terminals in the sidelink transmission system is a problem that needs to be solved.

Based on the above problems, the present disclosure provides a solution of sidelink transmission. A terminal device may determine whether to use available transmission resources for sidelink transmission based on a result of a channel access procedure, so that the terminal device can use an unlicensed spectrum for sidelink transmission.

The technical solution of the present disclosure will be described in detail by specific embodiments below.

Figure 15:
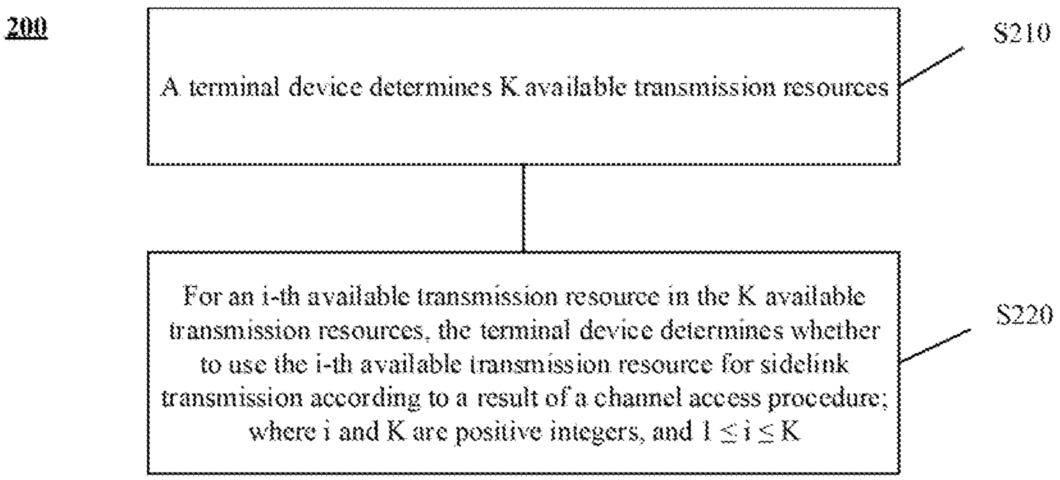
FIG. 15 is a schematic flowchart of a method for wireless communication according to an embodiment of the present disclosure.

FIG. 15 is a schematic flowchart of a method for wireless communication 200 according to an embodiment of the present disclosure. As illustrated in FIG. 15, the method for wireless communication 200 may include at least some of the following contents.

At S210, a terminal device determines K available transmission resources.

At S220, for an i-th available transmission resource in the K available transmission resources, the terminal device determines whether to use the i-th available transmission resource for sidelink transmission according to a result of a channel access procedure; where i and K are positive integers, and $1 \le i \le K$.

The embodiments of the present disclosure are applied to unlicensed spectrum. The i-th available transmission resource may be any one of the K available transmission resources. In some embodiments, the channel access procedure may also be an LBT procedure. That is, the terminal device determines whether to use the i-th available transmission resource for sidelink transmission according to the result of the channel access procedure, which may also be expressed as: the terminal device determines whether to use the i-th available transmission resource for sidelink transmission according to the result of the LBT. For example, if the LBT is successful, the terminal device determines to use the i-th available transmission resource for sidelink transmission. If the LBT fails, the terminal device determines not to use the i-th available transmission resource for sidelink transmission, or the terminal device drops a sidelink transmission corresponding to the i-th available transmission resource.

It should be understood that the available transmission resources in the present embodiment may be the available transmission resources determined by the terminal through a resource selection process or resource reselection process (e.g. the available transmission resources determined by Mode 2), or may be the available transmission resources determined according to resource allocation information of the network (e.g. the available transmission resources determined by Mode 1).

In some embodiments, the operation S210 may specifically include that:

the terminal device determines the K available transmission resources according to a sidelink resource allocation mode corresponding to the mode 2 (i.e., sidelink resource allocation mode 2).

It should be noted that the mode 2 is the second mode mentioned above.

In some embodiments, the terminal device determines a sensing window and a selection window; and the terminal device determines the K available transmission resources in the selection window according to a sensing result in the sensing window.

Specifically, for example, the terminal device determines a candidate resource set in the selection window based on the sensing result in the sensing window, and reports the candidate resource set to the high layer of the terminal device, and the high layer selects K resources randomly from the candidate resource set as available transmission resources (i.e. K available transmission resources). Further, the high layer informs the physical layer of the terminal of the selected K available transmission resources.

In some embodiments, the operation S210 may specifically include that:

the terminal device determines the K available transmission resources according to ta sidelink resource allocation mode corresponding to the mode 1 (i.e., sidelink resource allocation mode 1).

It should be noted that the mode 1 is the first mode mentioned above.

Specifically, for example, the terminal device receives third indication information sent by the network device, the third indication information being used for allocation of sidelink transmission resources for the terminal device; and the terminal device determines the K available transmission resources according to the third indication information. For example, the third indication information is DCI, i.e. the terminal determines the K available transmission resources according to the DCI transmitted by the network. For another example, the third indication information is a RRC signaling, the network configures Type-1 sidelink configuration grant transmission resources for the terminal through the RRC signaling, and the terminal determines the K available transmission resources according to the RRC signaling.

In some embodiments, the terminal device determines to use the i-th available transmission resource for sidelink transmission in a case that the result of the channel access procedure indicates a channel being idle. Otherwise, the terminal device determines not to use the i-th available transmission resource for sidelink transmission, or drops a sidelink transmission corresponding to the i-th available transmission resource.

In some embodiments, the terminal device determines to use the i-th available transmission resource for sidelink transmission in a case that the result of the channel access procedure indicates a channel being idle.

In some embodiments, the terminal device determines not to use the i-th available transmission resource for sidelink transmission or drops a sidelink transmission corresponding to the i-th available transmission resource, in a case that the result of the channel access procedure indicates a channel being not idle.

In some embodiments, the terminal device transmits target information in a transmission occasion before a time unit where the i-th available transmission resource is located in a case that the result of the channel access procedure indicates a channel being idle.

In some embodiments, the target information is not valid sidelink data or signal.

In some embodiments, the target information includes, but is not limited to, at least one of the following:

a redundant bit, a padding bit, or a cyclic prefix extension (CP-extension).

In some embodiments, the target information is determined according to sidelink data to be transmitted. For example, the target information is a replica of the sidelink data to be transmitted, or for example, the target information is a replica of the data on the first time domain symbol.

In some embodiments, the terminal device determines at least one transmission opportunity before the time unit where the i-th available transmission resource is located according to configuration information, where the configuration information includes pre-configuration information, or configuration information from a network device.

In some embodiments, the terminal device determines a time domain position corresponding to an earliest transmission opportunity where transmission of the target information is allowed according to the first information. Specifically, a channel(s) may be preempted by transmitting data in advance, and the terminals (such as WiFi terminals) of other systems can be prevented from preempting the channel(s).

In some embodiments, the first information includes a first parameter and/or a channel busy ratio (CBR), and the first parameter includes, but is not limited to, at least one of the following: priority information, reliability information, delay information or transport block size (TBS). The priority information is, for example, priority information carried in Sidelink Control Information (SCI).

In some embodiments, the terminal device determines the time domain position corresponding to the earliest transmission opportunity in at least one transmission opportunity where the transmission of the target information is allowed according to the first information and a first correspondence.

Herein, the first correspondence includes a correspondence between the first information and the time domain position corresponding to the earliest transmission opportunity in the at least one transmission opportunity where the transmission of the target information is allowed.

In some embodiments, the first correspondence is agreed in a protocol or pre-configured, or the first correspondence is configured by a network device.

In some embodiments, the terminal device determines the number of transmission opportunities where the transmission of the target information is allowed according to the second information.

In some embodiments, the second information includes a second parameter and/or a CBR, and the second parameter includes, but is not limited to, at least one of the following: priority information, reliability information, delay information or TBS. The priority information is, for example, priority information carried in SCI.

In some embodiments, the terminal device determines the number of transmission opportunities where the transmission of the target information is allowed according to the second information and a second correspondence.

Herein, the second correspondence includes a correspondence between the second information and the number of transmission opportunities where the transmission of the target information is allowed.

In some embodiments, the second correspondence is agreed in a protocol or pre-configured, or the second correspondence is configured by a network device.

In some embodiments, the terminal device performs the channel access procedure within a GP of a time unit preceding the time unit where the i-th available transmission resource is located. Specifically, for example, the terminal device performs the channel access procedure within the GP symbol of a slot preceding a slot where the i-th available transmission resource is located.

In some embodiments, the channel access procedure includes one of the following:

a first type of channel access procedure, a second type of channel access procedure, or a third type of channel access procedure.

Herein, the first type of channel access procedure includes Type1 channel access, the second type of channel access procedure includes Type 2A channel access and/or Type 2B channel access, and the third type channel access procedure includes Type 2C channel access.

In some embodiments, the channel access procedure is the second type of channel access procedure or the third type of channel access procedure in a case that the i-th available transmission resource is located within a shared COT.

In some embodiments, the channel access procedure is the first type of channel access procedure in a case that the i-th available transmission resource is not located within a shared COT.

It should be noted that in the shared spectrum, the communication device needs to perform LBT (also known as channel sensing) before transmitting channels or signals, and the channels or signals are transmitted only after the LBT is successful, but the channels or signals are not transmitted when the LBT fails. Therefore, the communication on the shared spectrum is an opportunistic transmission. From the perspective of the system network deployment, the channel sensing includes two mechanisms, one is an LBT of load-based equipment (LBE), which is also called a dynamic channel detection, a dynamic channel access or a dynamic channel occupation, and the other is an LBT of frame-based equipment (FBE), which is also called a semi-persistent channel sensing, a semi-persistent channel access or a semi-persistent channel occupation.

In the channel access mechanism of LBE, or in the dynamic channel access mode, there are many different channel access schemes, such as Type 1 channel access, Type 2A channel access, Type 2B channel access and Type 2C channel access.

Type 1 channel access is described as follows.

The channel sensing manner of the communication device is multi-slot channel sensing based on random backoff adjusted by a size of a contention window. The number of detection slots in which channel sensing is performed is generated randomly according to the contention window, and the size of the contention window is determined according to the CAPC corresponding to the transmission service. Specifically, under the Type 1 channel access, different CAPCs are included depending on the priorities of the transmission services. For example, the above Table 1 is an example of channel access parameters corresponding to different CAPCs. The smaller the value of p is, the higher the channel access priority class becomes. Optionally, the above Table 1 is used for Type 1 channel access for uplink transmission of terminal device.

Type 2A channel access is described as follows.

The channel sensing manner of the communication device is channel sensing in a single detection slot with a fixed length of 25 microseconds. Specifically, under the Type 2A channel access, the communication device may perform channel sensing within a detection slot of 25 microseconds before transmission starts, and perform transmission after successful channel sensing.

Type 2B channel access is described as follows.

The channel sensing manner of the communication device is channel sensing in a single detection slot with a fixed length of 16 microseconds. Specifically, under the Type 2B channel access, the communication device may perform channel sensing within a detection slot of 16 microseconds before transmission starts, and perform transmission after successful channel sensing. The gap length between the starting position of the transmission and the ending position of the last transmission is 16 microseconds.

Type 2C channel access is described as follows.

The communication device performs transmission without channel sensing after the gap ends. Specifically, under the Type 2C channel access, the communication device may perform transmission directly, but the gap length between the starting position of the transmission and the ending position of the last transmission is less than or equal to 16 microseconds. In addition, the length of the transmission does not exceed 584 microseconds.

In some embodiments, the terminal device receives first indication information sent by other terminals, the first indication information being used to indicate information of the shared COT.

In some embodiments, the first indication information is transmitted via SCI or a PC5 Radio Resource Control (PC5-RRC) signaling.

In some embodiments, the terminal device carries information of the shared COT in the transmitted SCI when the terminal device determines that the channel is idle through a first type of channel procedure.

In some embodiments, the terminal device receives SCI sent by another terminal device, where the SCI indicates first shared COT information, and the terminal device carries second shared COT information in the transmitted SCI when the terminal device determines that a channel is idle through a second type of channel access procedure or through a third type of channel access procedure within the shared COT, where the second shared COT information is determined based on the first shared COT information. For example, a first terminal device receives SCI from a second terminal device in slot n, and the SCI indicates that the shared COT (i.e. the first shared COT information) is four slots, i.e., the shared COT includes slot n, slot n+1, slot n+2 and slot n+3. If the available transmission resource determined by the first terminal device is slot n+2, and the channel is determined to be idle through a second type of channel access procedure in the GP symbol of the slot n+1, then the first terminal device performs sidelink transmission in the slot n+2, and it is indicated by SCI of the sidelink transmission that the shared COT (i.e. the second shared COT information) is two slots, i.e. the shared COT includes slot n+2 and slot n+3.

In some embodiments, the terminal device receives second indication information sent by a network device, the second indication information being used to indicate the information of the shared COT.

In some embodiments, the second indication information is transmitted via downlink control information (DCI) or a radio resource control (RRC) signaling.

In some embodiments, the time unit is at least one of the following: millisecond, slot, mini-slot, OFDM symbol, or subframe. The mini-slot includes at least one OFDM symbol.

Figure 16:
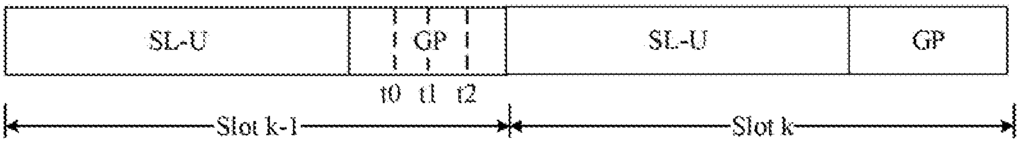
FIG. 16 is a schematic diagram of available transmission resources provided by the present disclosure.

Specifically, for example, as illustrated in FIG. 16, on the Sidelink-based access to unlicensed spectrum (SL-U), the slot k is a slot in which an available transmission resource is located, and the terminal performs LBT before using the resource for sidelink transmission, for example, LBT is performed in the GP symbol of the slot k−1, and the GP symbol of the slot k−1 includes three transmission opportunities, which is t0, t1 and t2 respectively. If the terminal performs LBT successfully, the terminal may transmit the sidelink data or signal (i.e., the above target information) in advance before the slot k, and terminals with higher priority may transmit the sidelink data or signal (i.e., the target information) earlier, so as to preempt the channel, and the terminals of other systems (such as terminals of WiFi) and the terminals with lower priority can be prevented from preempting the channel. For example, the earliest time domain position where the terminal whose priority class is 0 may transmit sidelink data or signal (i.e., the target information) is t0, the earliest time domain position where the terminal whose priority class is 1 may transmit sidelink data or signal (i.e., the target information) is t1, and the earliest time domain position where the terminal whose priority class is 2 may transmit sidelink data or signal (i.e., the target information) is t2. The lower the value of priority class is, the higher the priority will be.

Specifically, for another example, in FIG. 16, the time domain positions where the terminal whose priority class is 0 may transmit sidelink data or signal (i.e., the target information) are t0, t1 and t2 (i.e., total 3 positions), the time domain positions where the terminal whose priority class may transmit sidelink data or signal (i.e., the target information) are t1 and t2 (i.e., total 2 positions), and the earliest time domain position where the terminal whose priority class is 2 may transmit sidelink data or signal (i.e., the target information) is t2 (i.e., total 1 position). The lower the value of priority class is, the higher the priority is. A terminal with a higher priority may have more chances to transmit sidelink data or signals (i.e., the target information), resulting in higher probability of successful channel preemption. A terminal with a lower priority has less chance to transmit sidelink data or signals (i.e., the target information), resulting in the lower probability of successful channel preemption.

Therefore, in the embodiments of the present disclosure, for the i-th available transmission resource in the K available transmission resources, the terminal device determines whether to use the i-th available transmission resource for sidelink transmission according to the result of the channel access procedure, so that the terminal device can use the unlicensed spectrum for sidelink transmission.

Further, for mode 2, in the sidelink transmission system, in the process of determining available transmission resources, it is necessary to avoid interference between terminals in the system by sensing. The terminal performs sidelink transmission based on the results of LBT and sensing, so that the terminal can perform sidelink transmission using an unlicensed spectrum.

The method embodiments of the present disclosure have been described in detail above with reference to FIG. 15 to FIG. 16, and the apparatus embodiments of the present disclosure will be described in detail below with reference to FIG. 17. It should be understood that the apparatus embodiments and the method embodiments correspond to each other, and similar descriptions thereof may refer to the method embodiments.

Figure 17:
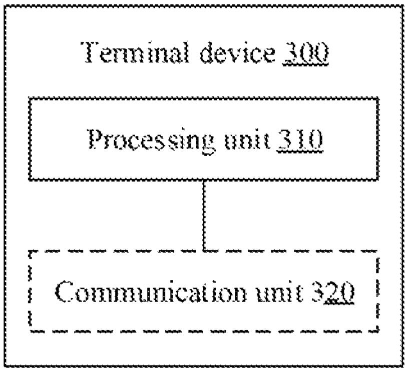
FIG. 17 is a schematic block diagram of a terminal device provided by an embodiment of the present disclosure.

FIG. 17 illustrates a schematic block diagram of a terminal device 300 according to an embodiment of the present disclosure. As illustrated in FIG. 17, the terminal device 300 includes a processing unit 310.

The processing unit 310 is configured to determine K available transmission resources; and for an i-th available transmission resource in the K available transmission resources, the processing unit 310 is further configured to determine whether to use the i-th available transmission resource for sidelink transmission according to a result of a channel access procedure; where i and K are positive integers, and $1 \le i \le K$.

In some embodiments, the processing unit 310 is specifically configured to:

determine to use the i-th available transmission resource for sidelink transmission in a case that the result of the channel access procedure indicates a channel being idle; or determine not to use the i-th available transmission resource for sidelink transmission, or drop a sidelink transmission corresponding to the i-th available transmission resource in a case that the result of the channel access procedure indicates a channel being not idle.

In some embodiments, the terminal device 300 further includes a communication unit 320.

The communication unit 320 is configured to transmit target information in a transmission opportunity before a time unit where the i-th available transmission resource is located in a case that the result of the channel access procedure indicates a channel being idle.

Herein, the target information includes at least one of: a redundant bit, a padding bit, or a cyclic prefix extension.

In some embodiments, the processing unit 310 is further configured to determine at least one transmission opportunity before the time unit where the i-th available transmission resource is located according to configuration information, where the configuration information includes pre-configuration information, or configuration information from a network device.

In some embodiments, the processing unit 310 is further configured to determine a time domain position corresponding to an earliest transmission opportunity where transmission of the target information is allowed according to the first information.

Herein, the first information includes a first parameter and/or a channel busy ratio CBR, and the first parameter includes at least one of the following: priority information, reliability information, delay information or TBS.

In some embodiments, the processing unit 310 is specifically configured to:

determine the time domain position corresponding to the earliest transmission opportunity in at least one transmission opportunity where the transmission of the target information is allowed according to the first information and a first correspondence.

Herein, the first correspondence includes a correspondence between the first information and the time domain position corresponding to the earliest transmission opportunity in the at least one transmission opportunity where the transmission of the target information is allowed.

In some embodiments, the first correspondence is agreed in a protocol or pre-configured, or the first correspondence is configured by a network device.

In some embodiments, the processing unit 310 is further configured to determine the number of transmission opportunities where the transmission of the target information is allowed according to second information.

Herein, the second information includes a second parameter and/or a CBR, and the second parameter includes at least one of the following: priority information, reliability information, delay information or TBS.

In some embodiments, the processing unit 310 is specifically configured to:

determine the number of transmission opportunities where the transmission of the target information is allowed according to the second information and a second correspondence.

Herein, the second correspondence includes a correspondence between the second information and the number of transmission opportunities where the transmission of the target information is allowed.

In some embodiments, the second correspondence is agreed in a protocol or pre-configured, or the second correspondence is configured by a network device.

In some embodiments, the processing unit 310 is further configured to perform the channel access procedure within a GP of a time unit preceding the time unit where the i-th available transmission resource is located.

In some embodiments, the channel access procedure includes one of the following:

a first type of channel access procedure, a second type of channel access procedure, or a third type of channel access procedure.

Herein, the first type of channel access procedure includes Type1 channel access, the second type of channel access procedure includes Type 2A channel access and/or Type 2B channel access, and the third type channel access procedure includes Type 2C channel access.

In some embodiments, the channel access procedure is the second type of channel access procedure or the third type of channel access procedure in a case that the i-th available transmission resource is located within a shared COT; and/or the channel access procedure is the first type of channel access procedure in a case that the i-th available transmission resource is not located within a shared COT.

In some embodiments, the terminal device 300 further includes a communication unit 320.

The communication unit 320 is configured to receive first indication information from another terminal, the first indication information being used for indicating information of the shared COT.

In some embodiments, the first indication information is transmitted via SCI or a PC5-RRC signaling.

In some embodiments, the terminal device 300 further includes a communication unit 320.

The communication unit 320 is configured to receive second indication information from a network device, the second indication information being used for indicating information of the shared COT.

In some embodiments, the second indication information is transmitted via DCI or a RRC signaling.

In some embodiments, the processing unit 310 is specifically configured to:

determine the K available transmission resource according to a sidelink resource allocation manner corresponding to mode 2.

In some embodiments, the processing unit 310 is specifically configured to:

determine a sensing window and a selection window; and determine the K available transmission resources within the selection window according to a sensing result in the sensing window.

In some embodiments, the processing unit 310 is specifically configured to:

determine the K available transmission resource according to a sidelink resource allocation manner corresponding to mode 1.

In some embodiments, the terminal device 300 further includes a communication unit 320.

The communication unit 320 is configured to receive third indication information from a network device, the third indication information being used for allocation of sidelink transmission resources for the terminal device.

The processing unit 310 is specifically configured to determine the K available transmission resources according to the third indication information.

In some embodiments, the communication unit may be a communication interface or a transceiver or an input-output interface of a communication chip or a system-on-chip. The processing unit may be one or more processors.

It should be understood that the terminal device 300 according to the embodiments of the present disclosure may correspond to the terminal device in the method embodiments of the present disclosure, and the above and other operations and/or functions of the individual units in the terminal device 300 are designed to implement the respective flow of the terminal device in the method 200 for wireless communication illustrated in FIG. 15, respectively, which will not be repeated here for the sake of brevity.

Figure 18:
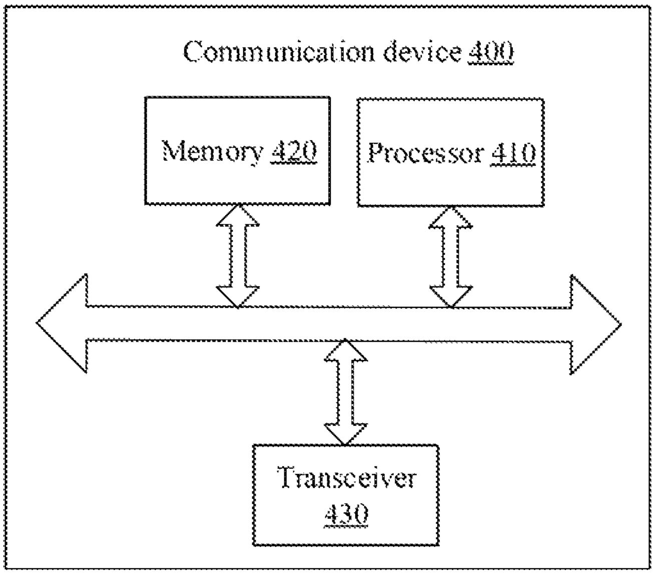
FIG. 18 is a schematic block diagram of a communication device provided by an embodiment of the present disclosure.

FIG. 18 is a schematic structural diagram of a communication device 400 provided by an embodiment of the present disclosure. The communication device 400 illustrated in FIG. 18 includes a processor 410 that may call and execute a computer program from a memory to implement the method in the embodiments of the present disclosure.

In some embodiments, the communication device 400 may also include a memory 420 as illustrated in FIG. 18. The processor 410 may call and execute a computer program from the memory 420 to implement the method in the embodiments of the present disclosure.

The memory 420 may be a separate device independent of the processor 410 or may be integrated in the processor 410.

In some embodiments, the communication device 400 may also include a transceiver 430 as illustrated in FIG. 18. The processor 410 may control the transceiver 430 to communicate with other devices, and in particular send information or data to other devices, or receive information or data sent by other devices.

The transceiver 430 may include a transmitter and a receiver. The transceiver 430 may further include antennas. The number of the antennas may be one or more.

In some embodiments, the communication device 400 may be specifically the network device of the embodiments of the present disclosure, and the communication device 400 may implement corresponding processes implemented by the network device in various methods of the embodiments of the present disclosure, which will not be repeated here for the sake of brevity.

In some embodiments, the communication device 400 specifically may be the terminal device of the embodiments of the present disclosure, and the communication device 400 may implement corresponding processes implemented by the terminal device in the respective methods of the embodiment of the present disclosure, which will not be repeated here for the sake of brevity.

Figure 19:
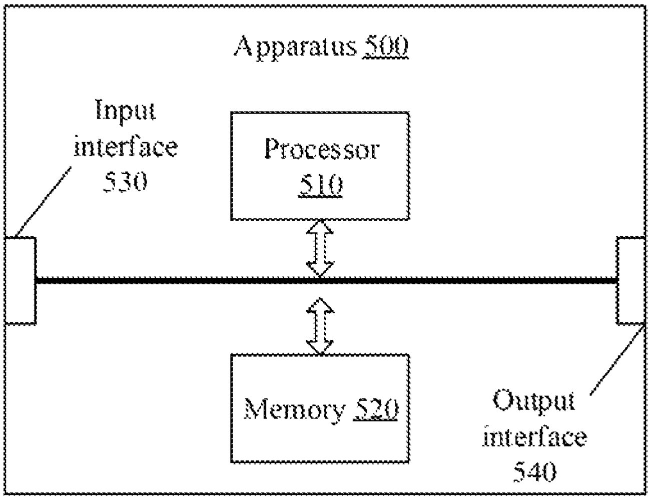
FIG. 19 is a schematic block diagram of an apparatus provided by an embodiment of the present disclosure.

FIG. 19 is a schematic structural diagram of an apparatus according to an embodiment of the present disclosure. The apparatus 500 illustrated in FIG. 19 includes a processor 510 that may call and execute a computer program from a memory to implement the method in the embodiments of the present disclosure.

In some embodiments, the apparatus 500 may also include a memory 520 as illustrated in FIG. 19. The processor 510 may call and execute a computer program from the memory 520 to implement the method in the embodiments of the present disclosure.

The memory 520 may be a separate device independent of the processor 510 or may be integrated in the processor 510.

In some embodiments, the apparatus 500 may also include an input interface 530. The processor 510 may control the input interface 530 to communicate with other devices or chips, and in particular obtain information or data sent by other devices or chips.

In some embodiments, the apparatus 500 may also include an output interface 540. The processor 510 may control the output interface 540 to communicate with other devices or chips, and in particular output information or data to other devices or chips.

In some embodiments, the apparatus may be applied to the network device of the embodiments of the present disclosure, and the apparatus may implement corresponding processes implemented by the network device in the respective methods of the embodiment of the present disclosure, which will not be repeated here for the sake of brevity.

In some embodiments, the apparatus may be applied to the terminal device of the embodiments of the present disclosure, and the apparatus may implement corresponding processes implemented by the terminal device in the respective methods of the embodiment of the present disclosure, which will not be repeated here for the sake of brevity.

In some embodiments, the apparatus mentioned in the embodiment of the present disclosure may also be a chip, for example, a system-level chip, a system chip, a chip system or a system-on-chip or the like.

Figure 20:
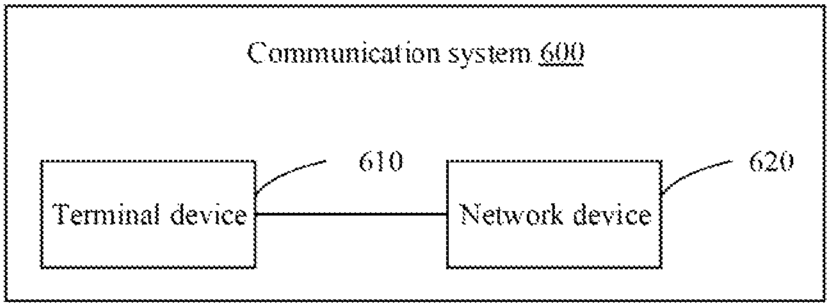
FIG. 20 is a schematic block diagram of a communication system provided by an embodiment of the present disclosure.

FIG. 20 is a schematic block diagram of a communication system 600 provided by an embodiment of the present disclosure. As illustrated in FIG. 20, the communication system 600 includes a terminal device 610 and a network device 620.

The terminal device 610 may be configured to implement corresponding functions implemented by the terminal device in the above method, and the network device 620 may be configured to implement corresponding functions implemented by the network device in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in the embodiments of the present disclosure. The general purpose processor may be a microprocessor or any conventional processor. The operations of the method disclosed in the embodiments of the present disclosure may be directly embodied as being executed by a hardware decoding processor or being executed by the hardware and software modules in a decoding processor. The software modules may be located in a storage medium mature in the art, such as a random access memory, a flash memory, a read-only memory, a programmable read-only memory or an electrically erasable programmable memory, a register, etc. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and a non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory in the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, configured to store a computer program.

In some embodiments, the computer readable storage medium may be applied to the network device of the embodiments of the present disclosure, and the computer program causes a computer to implement corresponding processes implemented by the network device in the methods of the embodiments of the present disclosure, which will not be repeated here for the sake of brevity.

In some embodiments, the computer readable storage medium may be applied to the terminal device of the embodiments of the present disclosure, and the computer program causes a computer to implement corresponding processes implemented by the terminal device in the methods of the embodiments of the present disclosure, which will not be repeated here for the sake of brevity.

In an embodiment of the present disclosure, there is further provided a computer program product, which includes computer program instructions.

In some embodiments, the computer program product may be applied to the network device of the embodiments of the present disclosure, and the computer program instructions cause a computer to implement corresponding processes implemented by the network device in the methods of the embodiments of the present disclosure, which will not be repeated here for the sake of brevity.

In some embodiments, the computer program product may be applied to the terminal device of the embodiments of the present disclosure, and the computer program instructions cause a computer to implement corresponding processes implemented by the terminal device in the methods of the embodiments of the present disclosure, which will not be repeated here for the sake of brevity.

In an embodiment of the present disclosure, there is further provided a computer program.

In some embodiments, the computer program may be applied to the network device of the embodiments of the present disclosure, and the computer program, when running on a computer, causes the computer to implement corresponding processes implemented by the network device in the methods of the embodiments of the present disclosure, which will not be repeated here for the sake of brevity.

In some embodiments, the computer program may be applied to the terminal device of the embodiments of the present disclosure, and the computer program, when running on a computer, causes the computer to implement corresponding processes implemented by the terminal device in the methods of the embodiments of the present disclosure, which will not be repeated here for the sake of brevity.

Those of ordinary skill in the art may realize that the various example units and algorithm steps described in connection with the embodiments disclosed herein may be implemented in electronic hardware or a combination of computer software and electronic hardware. Whether these functions are performed in hardware or software depends on the specific application and design constraints of the technical solution. Professionals may use different methods for each particular application to implement the described functionality, but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In the embodiments provided by the present disclosure, it should be understood that the disclosed systems, apparatuses and methods may be implemented in other manners. For example, the above-described embodiments of the apparatus is only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in the form of software functional units and sold or used as an independent product, they may be stored in a computer readable storage medium. Based on such an understanding, the technical solutions according to the disclosure in essence or the part contributing to the prior art or the part of the technical solution may be embodied in the form of a software product, and the computer software product is stored in a storage medium, which includes several instructions so that a computer device (may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art may easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method for wireless communication, comprising:
   determining, by a terminal device, K available transmission resources; and
   for an i-th available transmission resource in the K available transmission resources, determining, by the terminal device, whether to use the i-th available transmission resource for sidelink transmission according to a result of a channel access procedure;
   wherein i and K are positive integers, and 1≤i≤K,
   the method further comprising:
   transmitting, by the terminal device, target information in a transmission opportunity before a time unit where the i-th available transmission resource is located, in a case that the result of the channel access procedure indicates a channel being idle;
   wherein the target information comprises at least one of: a redundant bit, a padding bit, or a cyclic prefix extension.

2. The method of claim 1, wherein determining, by the terminal device, whether to use the i-th available transmission resource for sidelink transmission according to the result of the channel access procedure comprises:
   determining, by the terminal device, to use the i-th available transmission resource for sidelink transmission in a case that the result of the channel access procedure indicates a channel being idle; or
   in a case that the result of the channel access procedure indicates a channel being busy, determining, by the terminal device, not to use the i-th available transmission resource for sidelink transmission, or dropping, by the terminal device, a sidelink transmission corresponding to the i-th available transmission resource.

3. The method of claim 1, further comprising:
   determining, by the terminal device according to configuration information, at least one transmission opportunity before the time unit where the i-th available transmission resource is located, wherein the configuration information comprises pre-configuration information, or configuration information from a network device.

4. The method of claim 1, further comprising:
   determining, by the terminal device according to first information, a time domain position corresponding to an earliest transmission opportunity where transmission of the target information is allowed;
   wherein the first information comprises at least one of a first parameter or a channel busy ratio (CBR), and the first parameter comprises at least one of the following: priority information, reliability information, delay information or transport block size (TBS).

5. The method of claim 4, wherein determining, by the terminal device according to the first information, the time domain position corresponding to the earliest transmission opportunity where the transmission of the target information is allowed comprises:
   determining, by the terminal device according to the first information and a first correspondence, the time domain position corresponding to the earliest transmission opportunity in at least one transmission opportunity where the transmission of the target information is allowed;
   wherein the first correspondence comprises a correspondence between the first information and the time domain position corresponding to the earliest transmission opportunity in the at least one transmission opportunity where the transmission of the target information is allowed.

6. The method of claim 5, wherein the first correspondence is agreed in a protocol or pre-configured, or the first correspondence is configured by a network device.

7. The method of claim 1, further comprising:
   performing, by the terminal device, the channel access procedure within a guard period (GP) of a time unit preceding a time unit where the i-th available transmission resource is located.

8. The method of claim 1, wherein the channel access procedure comprises one of the following:
   a first type of channel access procedure, a second type of channel access procedure, or a third type of channel access procedure;
   wherein the first type of channel access procedure comprises Type1 channel access, the second type of channel access procedure comprises at least one of Type 2A channel access or Type 2B channel access, and the third type channel access procedure comprises Type 2C channel access.

9. The method of claim 8, wherein
   the channel access procedure is the second type of channel access procedure or the third type of channel access procedure in a case that the i-th available transmission resource is located within a shared channel occupancy time (COT); and/or
   the channel access procedure is the first type of channel access procedure in a case that the i-th available transmission resource is not located within a shared COT.

10. The method of claim 9, further comprising:
   receiving, by the terminal device, first indication information from another terminal, the first indication information being used for indicating information of the shared COT.

11. The method of claim 10, wherein the first indication information is transmitted via sidelink control information (SCI) or a PC5 radio resource control (PC5-RRC) signaling.

12. A terminal device, comprising: a processor, and a memory for storing a computer program, wherein the processor is configured to invoke and execute the computer program from the memory to cause the terminal device to:
   determine K available transmission resources; and
   for an i-th available transmission resource in the K available transmission resources, determine whether to use the i-th available transmission resource for sidelink transmission according to a result of a channel access procedure;
   wherein i and K are positive integers, and 1≤i≤K, wherein the processor is further configured to invoke and execute the computer program from the memory to cause the terminal device to:

transmit target information in a transmission opportunity before a time unit where the i-th available transmission resource is located, in a case that the result of the channel access procedure indicates a channel being idle;

wherein the target information comprises at least one of: a redundant bit, a padding bit, or a cyclic prefix extension.

13. The terminal device of claim 12, wherein the processor is specifically configured to invoke and execute the computer program from the memory to cause the terminal device to:

determine to use the i-th available transmission resource for sidelink transmission in a case that the result of the channel access procedure indicates a channel being idle; or in a case that the result of the channel access procedure indicates a channel being busy, determine not to use the i-th available transmission resource for sidelink transmission, or drop a sidelink transmission corresponding to the i-th available transmission resource.

14. The terminal device of claim 12, wherein the processor is further configured to invoke and execute the computer program from the memory to cause the terminal device to determine at least one transmission opportunity before the time unit where the i-th available transmission resource is located according to configuration information, wherein the configuration information comprises pre-configuration information, or configuration information from a network device.

15. The terminal device of claim 12, wherein the processor is further configured to invoke and execute the computer program from the memory to cause the terminal device to determine a time domain position corresponding to an earliest transmission opportunity where transmission of the target information is allowed according to the first information;

wherein the first information comprises at least one of a first parameter or a channel busy ratio (CBR), and the first parameter comprises at least one of the following: priority information, reliability information, delay information or transport block size (TBS).

16. The terminal device of claim 15, wherein the processor is configured to invoke and execute the computer program from the memory to cause the terminal device to:

determine the time domain position corresponding to the earliest transmission opportunity in at least one transmission opportunity where the transmission of the target information is allowed according to the first information and a first correspondence;

wherein the first correspondence comprises a correspondence between the first information and the time domain position corresponding to the earliest transmission opportunity in the at least one transmission opportunity where the transmission of the target information is allowed.

17. The terminal device of claim 16, wherein the first correspondence is agreed in a protocol or pre-configured, or the first correspondence is configured by a network device.

18. The terminal device of claim 12, wherein the processor is further configured to invoke and execute the computer program from the memory to cause the terminal device to perform the channel access procedure within a guard period (GP) of a time unit preceding the time unit where the i-th available transmission resource is located.

19. The terminal device of claim 12, wherein the channel access procedure comprises one of the following:

a first type of channel access procedure, a second type of channel access procedure, or a third type of channel access procedure;

wherein the first type of channel access procedure comprises Type1 channel access, the second type of channel access procedure comprises at least one of Type 2A channel access or Type 2B channel access, and the third type channel access procedure comprises Type 2C channel access.

20. A non-transitory computer-readable storage medium, configured to store a computer program that causes a computer to implement the following:

determining K available transmission resources; and for an i-th available transmission resource in the K available transmission resources, determining, by the terminal device, whether to use the i-th available transmission resource for sidelink transmission according to a result of a channel access procedure;

wherein i and K are positive integers, and 1≤i≤K, wherein the computer further causes the computer to implement the following:

transmitting target information in a transmission opportunity before a time unit where the i-th available transmission resource is located in a case that the result of the channel access procedure indicates a channel being idle;

wherein the target information comprises at least one of: a redundant bit, a padding bit, or a cyclic prefix extension.

* * * * *